(12) United States Patent
Lan

(10) Patent No.: US 10,801,541 B2
(45) Date of Patent: Oct. 13, 2020

(54) LOCKING STRUCTURE HAVING HIGH-TENSILE STRENGTH AND IMPACT RESISTANT ASSEMBLING DEVICE THEREWITH

(71) Applicant: Wistron Corporation, New Taipei (TW)

(72) Inventor: Chang-Feng Lan, New Taipei (TW)

(73) Assignee: Wistron Corporation, New Taipei (TW)

( * ) Notice: Subject to any disclaimer, the term of this patent is extended or adjusted under 35 U.S.C. 154(b) by 305 days.

(21) Appl. No.: 15/942,449

(22) Filed: Mar. 31, 2018

(65) Prior Publication Data

US 2019/0170183 A1 Jun. 6, 2019

(30) Foreign Application Priority Data

Dec. 6, 2017 (TW) .............................. 106142629 A

(51) Int. Cl.
*F16B 39/38* (2006.01)
*H04M 1/02* (2006.01)
*F16B 37/04* (2006.01)

(52) U.S. Cl.
CPC ............ *F16B 39/38* (2013.01); *F16B 37/048* (2013.01); *H04M 1/0202* (2013.01)

(58) Field of Classification Search
CPC ...... F16B 5/0208; F16B 37/04; F16B 37/041; F16B 37/044; F16B 37/048; F16B 37/122; F16B 39/38; H04M 1/0202
USPC .............. 411/103, 108, 172, 178, 427, 432; 16/2.1, 2.4
See application file for complete search history.

(56) References Cited

U.S. PATENT DOCUMENTS

| | | | | |
|---|---|---|---|---|
| 3,198,231 A | * | 8/1965 | Bisbing ................. | F16B 37/122 411/109 |
| 4,825,932 A | * | 5/1989 | Tildesley .............. | F16B 37/122 164/113 |
| 4,941,788 A | * | 7/1990 | Highfield ............. | F16B 37/122 411/178 |
| 5,266,258 A | * | 11/1993 | Martin ................. | B29C 66/612 264/249 |
| 5,455,986 A | * | 10/1995 | Gentile ................... | B29C 65/64 16/2.2 |

(Continued)

FOREIGN PATENT DOCUMENTS

| | | |
|---|---|---|
| CN | 201232695 Y | 5/2009 |
| CN | 102913529 A | 2/2013 |

(Continued)

*Primary Examiner* — Roberta S Delisle
(74) *Attorney, Agent, or Firm* — Winston Hsu

(57) ABSTRACT

A locking structure includes a main body, a first combining portion, and a second combining portion. The second combining portion is disposed on an outer periphery of the main body. The first combining portion is connected to a bottom portion of the main body. A chamber is formed inside the first combining portion. At least one slot is formed on a side wall or a bottom wall of the first combining portion and communicated with the chamber. The chamber is at least partially filled with the workpiece via the at least one slot, and the workpiece is at least partially combined with an inner side and an outer side of the first combining portion, so as to combine the locking structure with the workpiece tightly.

23 Claims, 11 Drawing Sheets

(56) References Cited

U.S. PATENT DOCUMENTS

| | | | |
|---|---|---|---|
| 6,692,207 B1* | 2/2004 | Bailey | F16B 37/122 |
| | | | 411/180 |
| 7,731,464 B2* | 6/2010 | Nagayama | F16B 3/06 |
| | | | 411/178 |
| 2011/0070047 A1* | 3/2011 | Martin | F16B 37/122 |
| | | | 411/178 |
| 2013/0031765 A1 | 2/2013 | Lan | |
| 2015/0023754 A1* | 1/2015 | Liu | F16B 37/125 |
| | | | 411/103 |
| 2015/0023757 A1* | 1/2015 | Chang | F16B 41/002 |
| | | | 411/173 |
| 2015/0056039 A1* | 2/2015 | Jin | F16B 37/048 |
| | | | 411/80.6 |
| 2015/0151504 A1* | 6/2015 | Yang | G06F 1/1613 |
| | | | 428/99 |
| 2015/0337886 A1* | 11/2015 | Coronado | B23P 19/04 |
| | | | 411/171 |

FOREIGN PATENT DOCUMENTS

| | | |
|---|---|---|
| TW | M347487 | 12/2008 |
| TW | M537021 U | 2/2017 |

* cited by examiner

LOCKING STRUCTURE HAVING HIGH-TENSILE STRENGTH AND IMPACT RESISTANT ASSEMBLING DEVICE THEREWITH

BACKGROUND OF THE DISCLOSURE

1. Field of the Disclosure

The present disclosure relates to a locking structure and a related impact resistant assembling device, and more particularly, to a locking structure having high-tensile strength and an impact resistant assembling device therewith.

2. Description of the Prior Art

With development of science and technology, portable electronic devices have been widely used in people's lives. While consumers enjoy the convenience brought by portable electronic devices, portable electronic devices, especially handheld electronic devices, such as cell phones and cameras, and their peripheral equipment, are often damaged caused by unintentional dropping. Thus, such products usually go through drop tests or destructive tests to ensure adequate structure strength before leaving the factories. However, a pulling force of a locking structure, such as bolts and nuts, is a key factor to determine the structural strength. Therefore, it is an important topic to enhance the pulling force of the locking structure in a limited mechanical space.

SUMMARY OF THE DISCLOSURE

Therefore, it is an objective of the present disclosure to provide a locking structure having high-tensile strength and an impact resistant assembling device therewith for solving the aforementioned problems.

In order to achieve the aforementioned objective, the present disclosure discloses a locking structure including a main body and a combining part. The combining part is connected to the main body. A communicating portion is formed on the combining part. A workpiece is at least partially combined with an inner side of the combining part via the communicating portion when the workpiece and the combining part are combined with each other.

According to an embodiment of the present disclosure, the combining part includes a first combining portion connected to a bottom portion of the main body. The communicating portion is formed on the first combining portion, and an inner side and an outer side of the first combining portion are communicated with each other by the communicating portion.

According to an embodiment of the present disclosure, the communicating portion includes a chamber structure and at least one slot structure. The chamber structure is formed inside the first combining portion. The at least one slot structure is formed on a side wall or a bottom wall of the first combining portion. The at least one slot structure is communicated with the chamber structure, and when the workpiece and the first combining portion are combined with each other, the chamber structure is at least partially filled with the workpiece via the at least one slot structure, so that the workpiece is at least partially combined with the inner side of the first combining portion.

According to an embodiment of the present disclosure, the combining part further includes a second combining portion disposed on an outer periphery of the main body, and the second combining portion interferes with the workpiece to at least partially combine the workpiece with the inner side of the first combining portion via the communicating portion when the locking structure is embedded into the workpiece.

According to an embodiment of the present disclosure, the second combining portion includes a first thread portion and a second thread portion.

According to an embodiment of the present disclosure, the first thread portion and the second thread portion are arranged oppositely and spaced from each other.

According to an embodiment of the present disclosure, the side wall is connected to the bottom portion of the main body.

According to an embodiment of the present disclosure, the chamber structure is enclosed and defined by the side wall of the first combining portion.

According to an embodiment of the present disclosure, the at least one slot structure is formed on the side wall of the first combining portion.

According to an embodiment of the present disclosure, the side wall is a ring-shaped structure.

According to an embodiment of the present disclosure, the bottom wall is perpendicularly connected to the side wall, and the at least one slot structure is formed on the bottom wall of the first combining portion.

According to an embodiment of the present disclosure, the side wall is connected to the bottom portion of the main body, the bottom wall is perpendicularly connected to the side wall. The chamber structure is enclosed and defined by the side wall and the bottom wall cooperatively, and the first combining portion includes a plurality of slot structures communicated with the chamber structure and located on the side wall and the bottom wall of the first combining portion.

According to an embodiment of the present disclosure, a through hole is formed inside the main body, and the chamber structure of the first combining portion is communicated with the through hole.

In order to achieve the aforementioned objective, the present disclosure further discloses an impact resistant assembling device including a first assembling component, a locking structure, a second assembling component, and a locking component. The locking structure is combined with the first assembling component. The locking structure includes a main body and a combining part. A through hole is formed inside the main body. The combining part is connected to the main body. A communicating portion is formed on the combining part. A first assembling component is at least partially combined with an inner side of the combining part via the communicating portion when the first assembling component and the combining part are combined with each other. An opening is formed on the second assembling component and located at a position corresponding to the locking structure. The locking component passes through the opening and the through hole to engage with the main body sequentially, so as to combine the second assembling component with the first assembling component.

In order to achieve the aforementioned objective, the present disclosure further discloses a locking structure including a combining portion. The combining portion includes a first combining portion and a second combining portion. When the locking structure is embedded with a workpiece, the second combining portion interferes with the workpiece, so that the workpiece is at least partially combined with an inner side of the first combining portion.

In summary, the locking structure of the present disclosure not only utilizes the second combining portion for combining with the first assembling component, i.e., the workpiece, but also utilizes the slot structure and the chamber structure for allowing the melted first assembling component, i.e., the workpiece, to flow into the chamber structure via the slot structure to at least partially combine the first assembling component, i.e., the workpiece, with the inner side and the outer side of the first combining portion. Therefore, a combining surface area of the locking structure and the first assembling component, i.e., the workpiece, is enlarged, which achieves a better combining effect and increases tensile strength. In such a way, the first assembling component and the second assembling component, which are assembled or combined with each other by the locking structure and the locking component, can bear higher impact. Furthermore, since the present disclosure increases the tensile strength without extending a length of the locking structure, such as a nut, it can not only save mechanical space but also facilitate lightweight design. Besides, the locking structure of the present disclosure can be combined with the first assembling component, i.e., the workpiece, by heating staking as well as the insert molding. Therefore, it can be widely used in different fields. Furthermore, as the locking structure is combined with the first assembling component by heat staking, it is not required to make a mold, which reduces manufacturing cost.

These and other objectives of the present disclosure will no doubt become obvious to those of ordinary skill in the art after reading the following detailed description of the preferred embodiment that is illustrated in the various figures and drawings.

DETAILED DESCRIPTION

In the following detailed description of the preferred embodiments, reference is made to the accompanying drawings which form a part hereof, and in which is shown by way of illustration specific embodiments in which the disclosure may be practiced. In this regard, directional terminology, such as "top," "bottom," "front," "back," etc., is used with reference to the orientation of the Figure(s) being described. The components of the present disclosure can be positioned in a number of different orientations. As such, the directional terminology is used for purposes of illustration and is in no way limiting. Accordingly, the drawings and descriptions will be regarded as illustrative in nature and not as restrictive.

Figure 1:
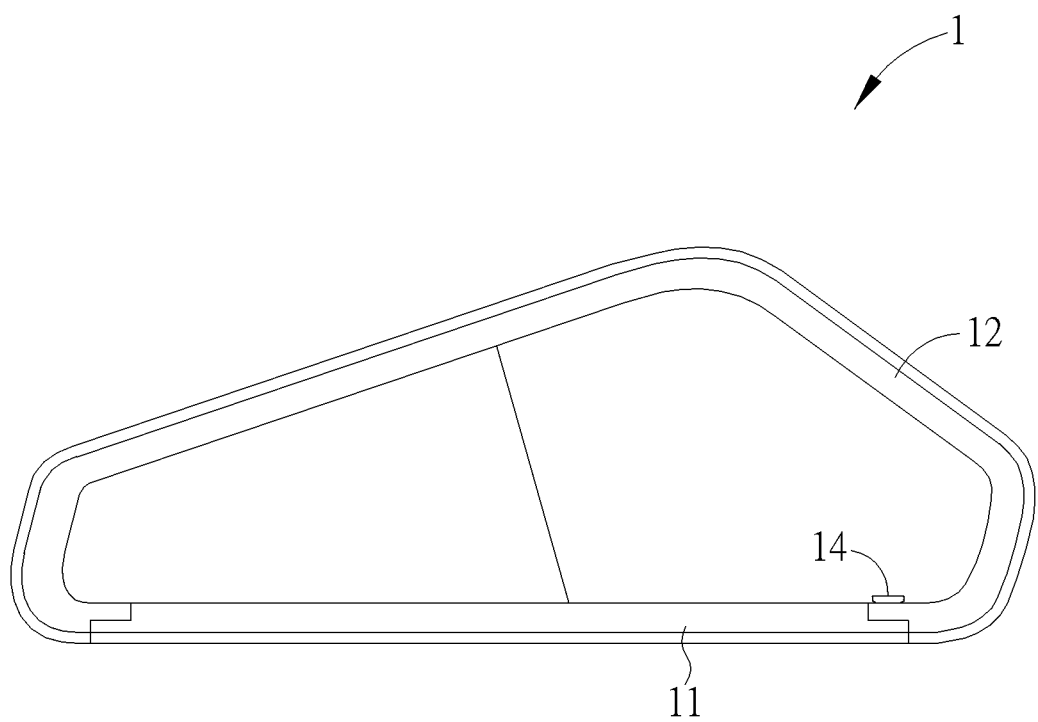
FIG. 1 is a schematic diagram of an impact resistant assembling device according to an embodiment of the present disclosure.
Figure 2:
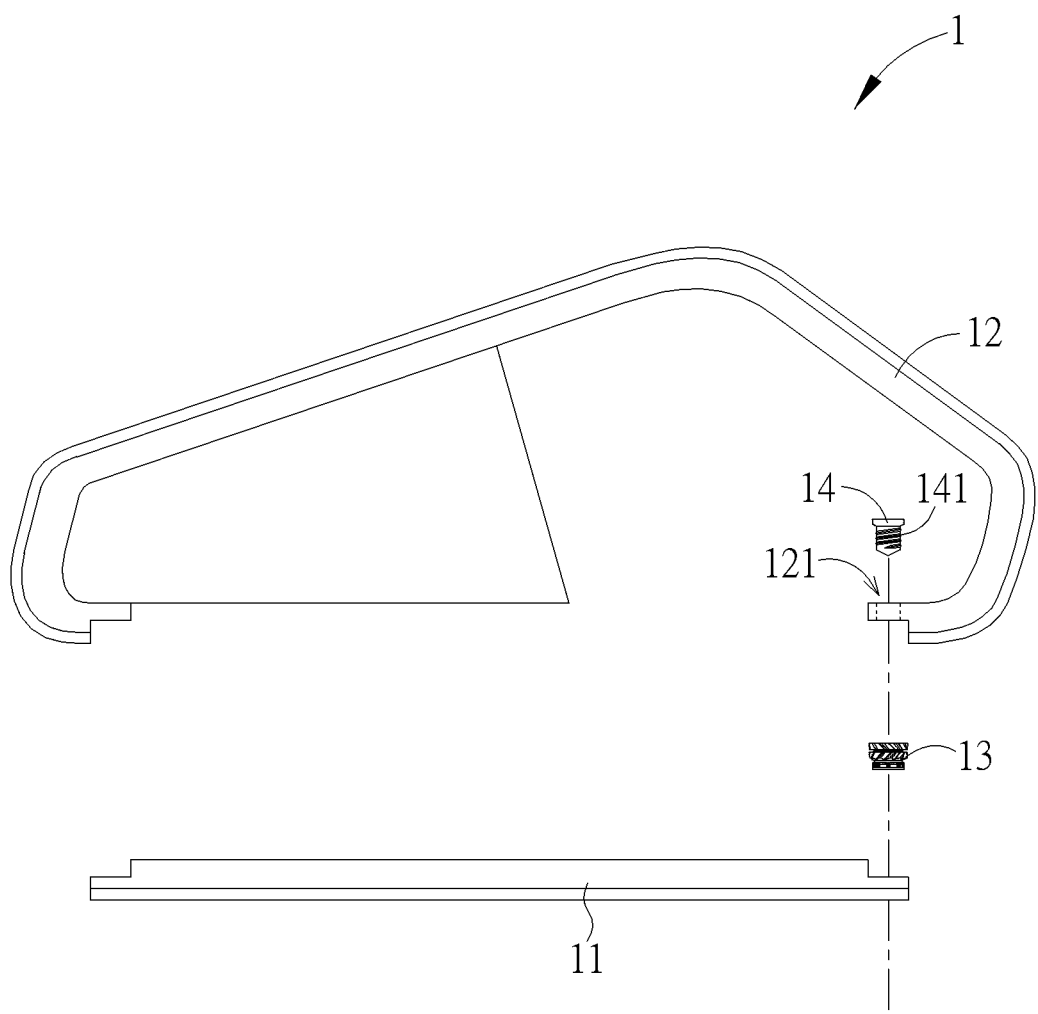
FIG. 2 is an exploded diagram of the impact resistant assembling device according to the embodiment of the present disclosure.

Please refer to FIG. 1 and FIG. 2. FIG. 1 is a schematic diagram of an impact resistant assembling device 1 according to an embodiment of the present disclosure. FIG. 2 is an exploded diagram of the impact resistant assembling device 1 according to the embodiment of the present disclosure. As shown in FIG. 1 and FIG. 2, the impact resistant assembling device 1 includes a first assembling component 11, a second assembling component 12, a locking structure 13, and a locking component 14. In this embodiment, the impact resistant assembling device 1 can be a charging seat of a portable electronic device which is a combination of the first assembling component 11 and the second assembling component 12. However, the present disclosure is not limited thereto. The locking structure 13 is combined with the first assembling component 11. The locking structure 13 can be a nut. The locking component 14 can be a screw. The first assembling component 11 can be a workpiece for combining with the locking structure 13. An opening 121 is formed on the second assembling component 12 and located at a position corresponding to the locking structure 13. The locking component 14 passes through the opening 121 to engage with the locking structure 13 by an outer thread 141 of the locking component 14, so that the second assembling component 12 and the first assembling component 11 can be assembled or combined with each other firmly.

Figure 3:
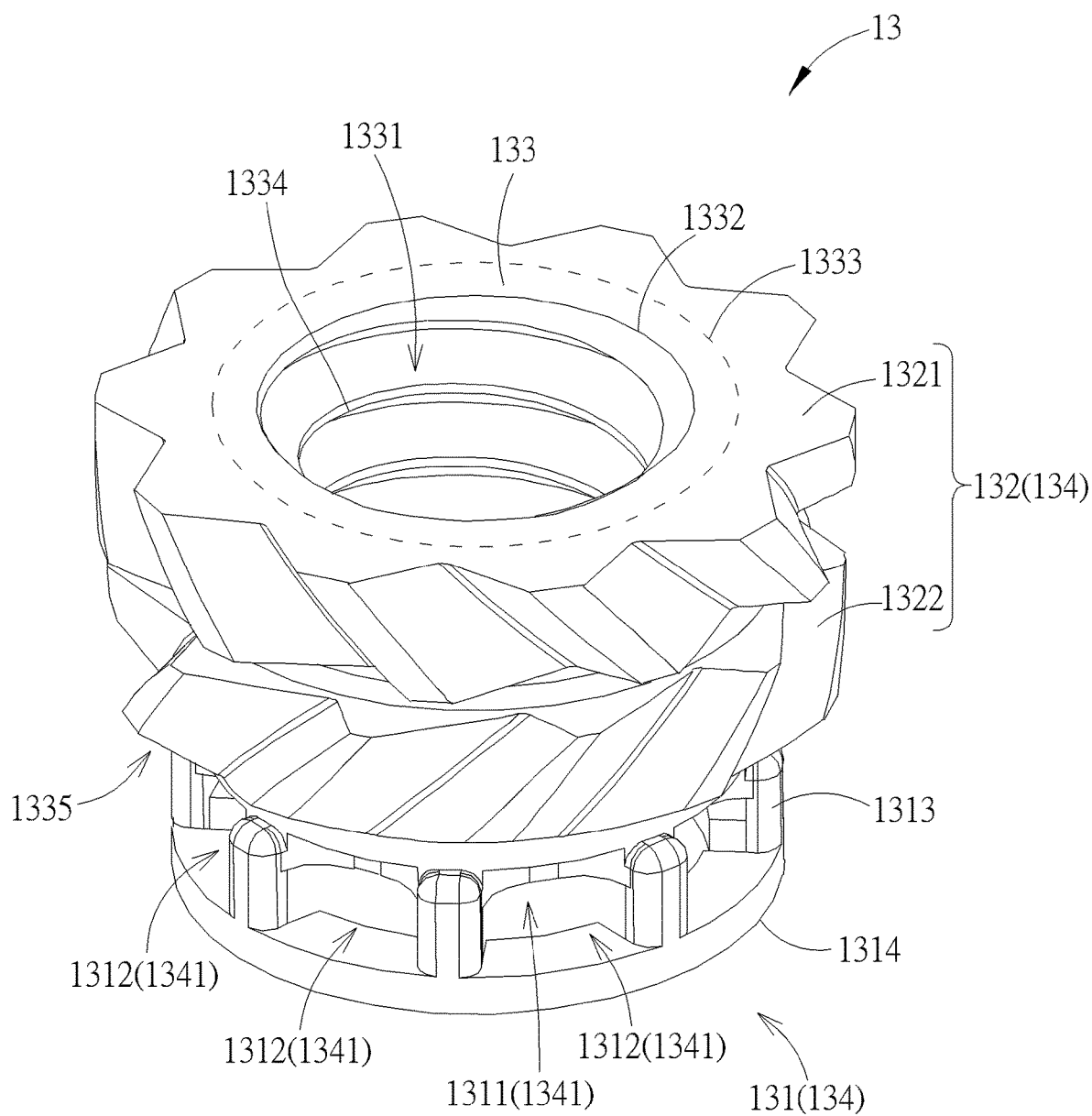
FIG. 3 and FIG. 4 are diagrams of a locking structure at different views according to the embodiment of the present disclosure.
Figure 4:
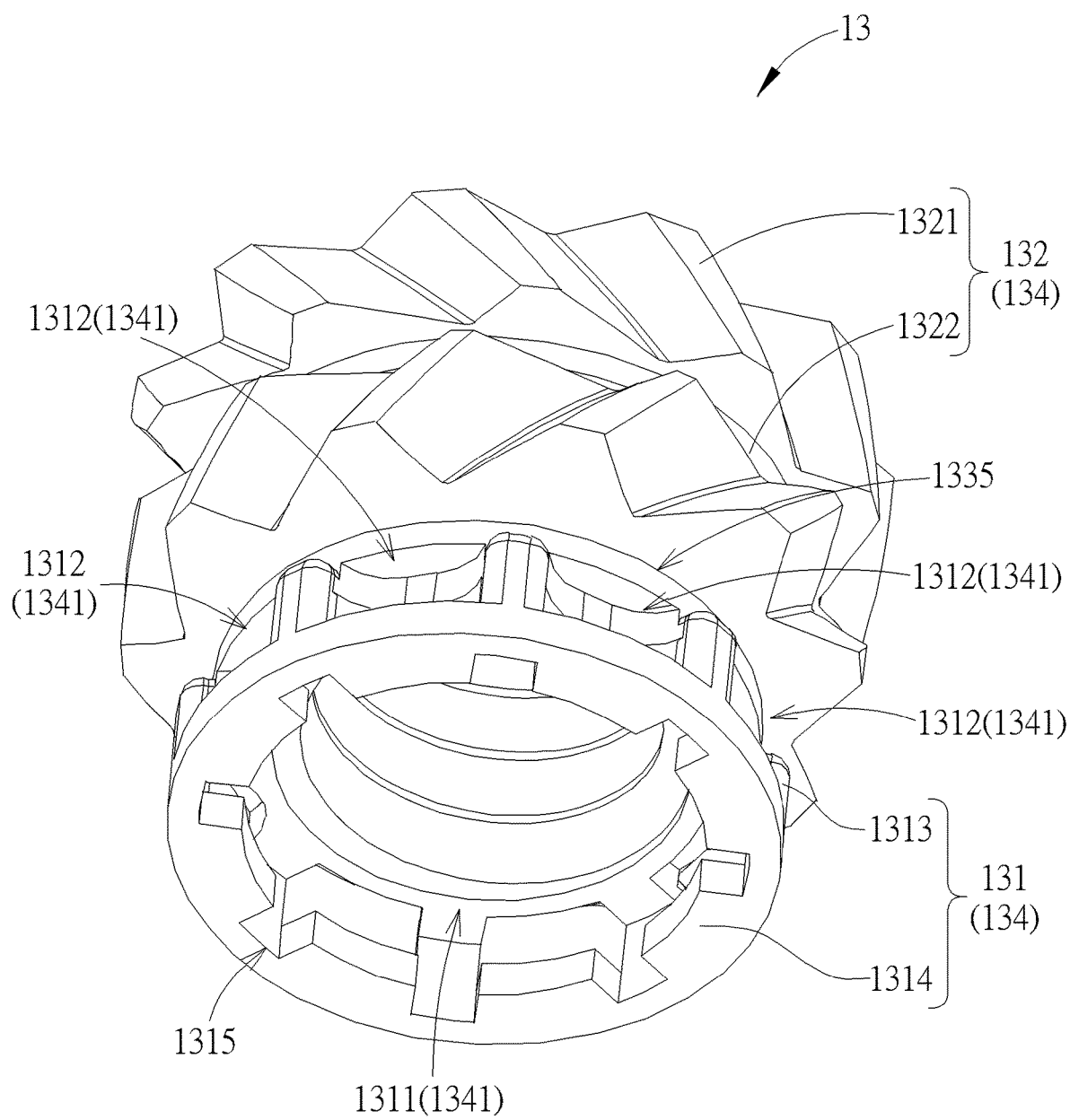

Please refer to FIG. 3 and FIG. 4. FIG. 3 and FIG. 4 are diagrams of the locking structure 13 at different views according to the embodiment of the present disclosure. As shown in FIG. 3 and FIG. 4, the locking structure 13 includes a main body 133 and a combining part 134 connected to the main body 133. A through hole 1331 is formed inside the main body 133. The main body 133 includes an inner periphery 1332 and an outer periphery 1333 opposite to the inner periphery 1332. An inner thread 1334 is formed on the inner periphery 1332 for engaging with the outer thread 141 of the locking component 14.

In this embodiment, the combining part 134 further includes a first combining portion 131 and a second combining portion 132. The second combining portion 132 is disposed on the outer periphery 1333 of the main body 133. The second combining portion 132 includes a first thread portion 1321 and a second thread portion 1322. The first thread portion 1321 and the second thread portion 1322 can be arranged oppositely and spaced from each other, so as to increase torsional strength in two opposite rotary directions, i.e., a clockwise direction and a counterclockwise direction. However, structure of the second combining portion 132 of the present disclosure is not limited to this embodiment. It depends on practical demands. For example, in another embodiment, the first thread portion 1321 and the second thread portion 1322 can be arranged in the same direction and adjacent to each other. In another embodiment, the second combining portion 132 even can include only the first thread portion 1321.

The first combining portion 131 is connected to a bottom portion 1335 of the main body 133. A communicating portion 1341 is formed on the first combining portion 131, and an inner side and an outer side of the first combining portion 131 are communicated with each other by the communicating portion 1341. Preferably, the communicating portion 1341 can includes a chamber structure 1311 formed inside the first combining portion 131, and at least one slot structure communicated with the chamber structure 1311. Specifically, the first combining portion 131 includes a side wall 1313 and a bottom wall 1314. The side wall 1313 is connected to the bottom portion 1335 of the main body 133. The bottom wall 1314 is perpendicularly connected to the side wall 1313 substantially. The chamber structure 1311 is enclosed by the side wall 1313 and the bottom wall 1314 cooperatively. The through hole 1331 and the chamber structure 1311 are communicated with each other. Eight slot structures 1312 are formed on the side wall 1313. One slot structure 1315 is formed on the bottom wall 1314. The slot structures 1312, 1315 are communicated with the chamber structure 1311 and for allowing the melted first assembling component 11 to enter into the chamber structure 1311 during a process of embedding the locking structure 13 into the first assembling component 11. The side wall 1313 can be a ring-shaped structure, and the eight slot structures 1312 are formed on a periphery of the ring-shaped structure. However, the numbers, the shapes, and the configurations of the chamber structure 1311 and the slot structures 1312, 1315 are not limited to those illustrated in the figures of this embodiment. It depends on practical demands.

Figure 5:
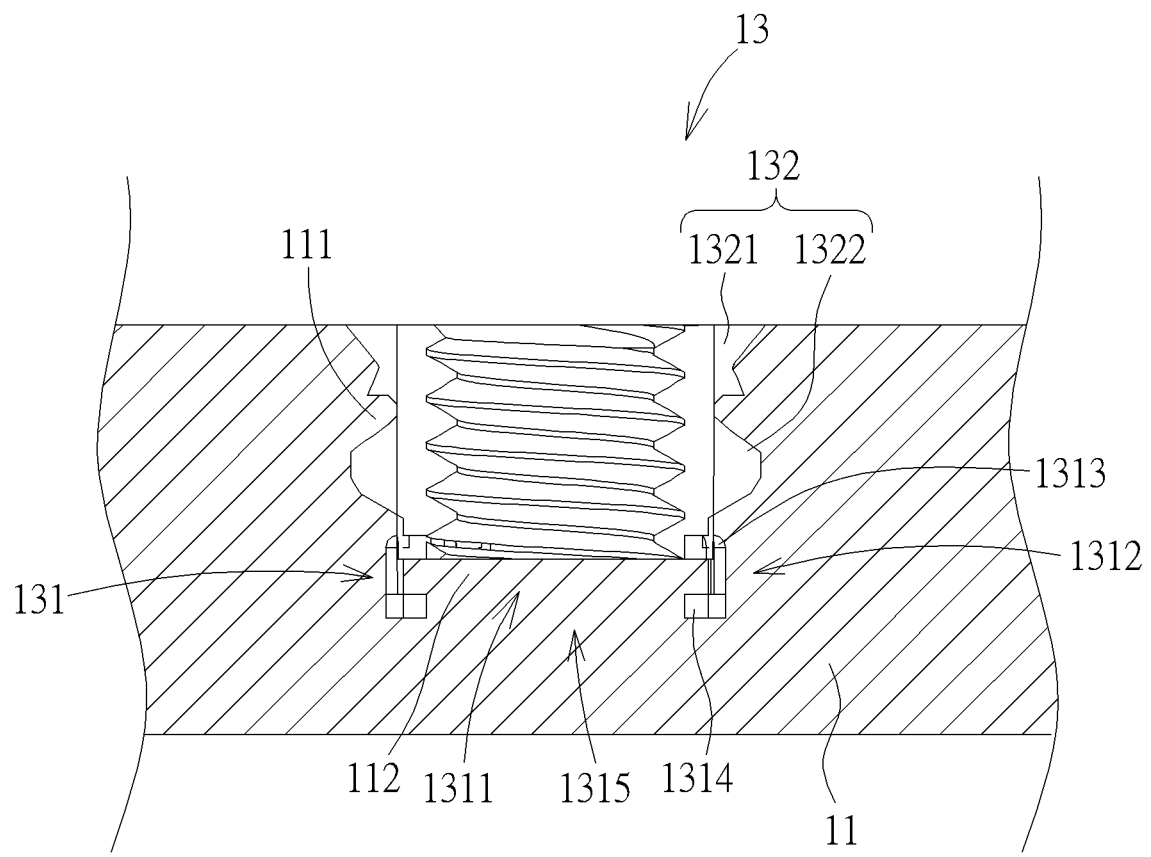
FIG. 5 is a diagram illustrating the locking structure has been completely combined with a first assembling component according to the embodiment of the present disclosure.
Figure 6:
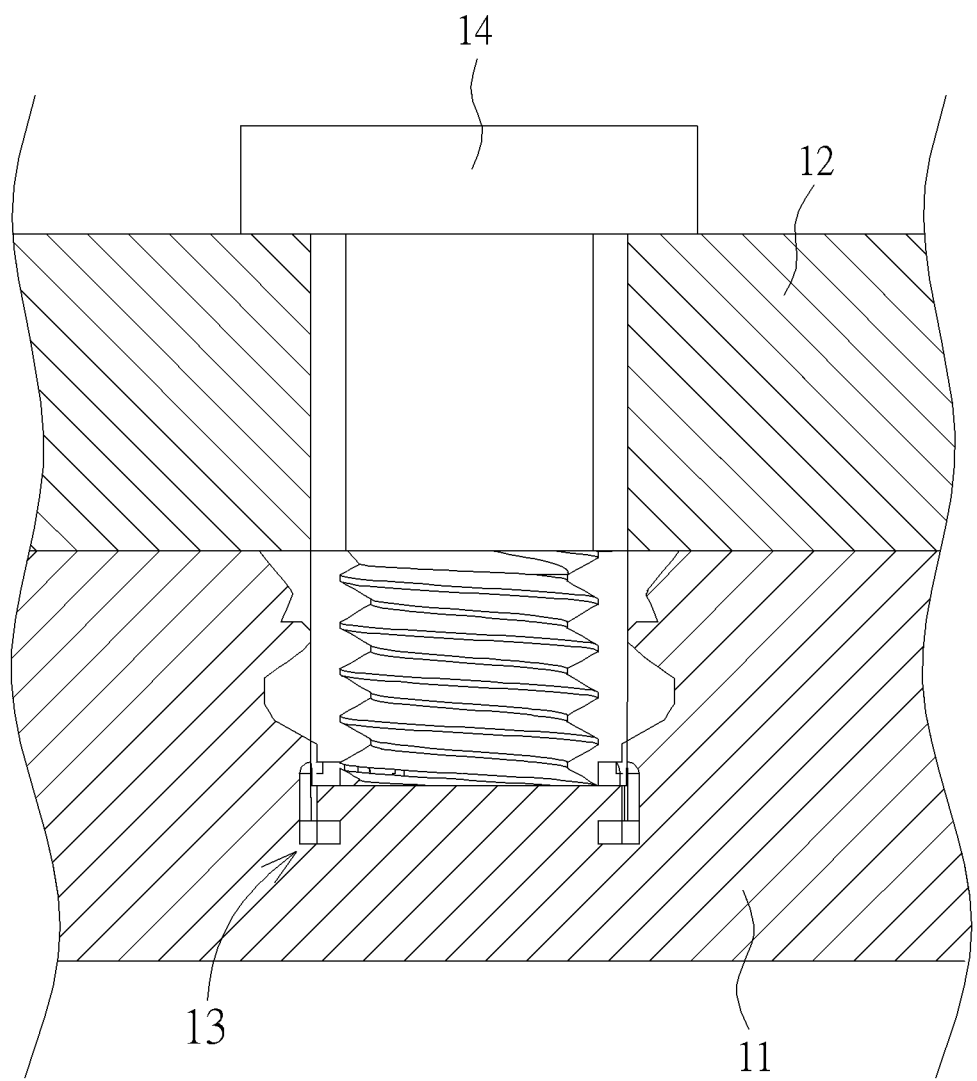
FIG. 6 is a partial sectional diagram of the impact resistant assembling device according to the embodiment of the present disclosure.

Please refer to FIG. 5 and FIG. 6. FIG. 5 is a diagram illustrating the locking structure 13 has been completely combined with the first assembling component 11 according to the embodiment of the present disclosure. FIG. 6 is a partial sectional diagram of the impact resistant assembling device 1 according to the embodiment of the present disclosure. As shown in FIG. 5, during a process of embedding the locking structure 13 into the first assembling component 11 by heat staking, the first assembling component 11 can be melted by interference of the second combining portion 132. A volume of the melted first assembling component 11 can be greater than a volume of a sum of recesses on the first thread portion 1321, the second thread portion 1322 and between the first thread portion 1321 and the second thread portion 1322. Therefore, during the aforementioned heat staking process, the recesses on the first thread portion 1321, the second thread portion 1322 and between the first thread portion 1321 and the second thread portion 1322 can be filled with a part 111 of the melted first assembling component 11, so that the part 111 of the melted first assembling component 11 can be combined with the second combining portion 132. Furthermore, another part 112 of the melted first assembling component 11 flows toward the first combining portion 131 downwardly. The chamber structure 1311 is filled with the another part 112 of the melted first assembling component 11 via the slot structures 1312 on the side wall 1313 and the slot structure 1315 on the bottom side 1314, so that the another part 112 of the first assembling component 11 is combined with inner sides and outer sides of the side wall 1313 and the bottom wall 1314 of the first assembling component 11. Therefore, a combining surface area of the first assembling component 11 and the first combining portion 131 can be increased for enhancing combining strength of the first assembling component 11 and the first combining portion 131. In such a way, the objective of that the locking structure 13 and the first assembling component 11 can be firmly combined with each other can be achieved by combination of the partial first assembling component 11 and the recesses on the first thread portion 1321, the second thread portion 1322 and between the first thread portion 1321 and the second thread portion 1322 of the second combining portion 132, and combination of the partial first assembling component 11 and the inner sides and the outer sides of the side wall 1313 and the bottom wall 1314 of the first combining portion 131.

Figure 7:
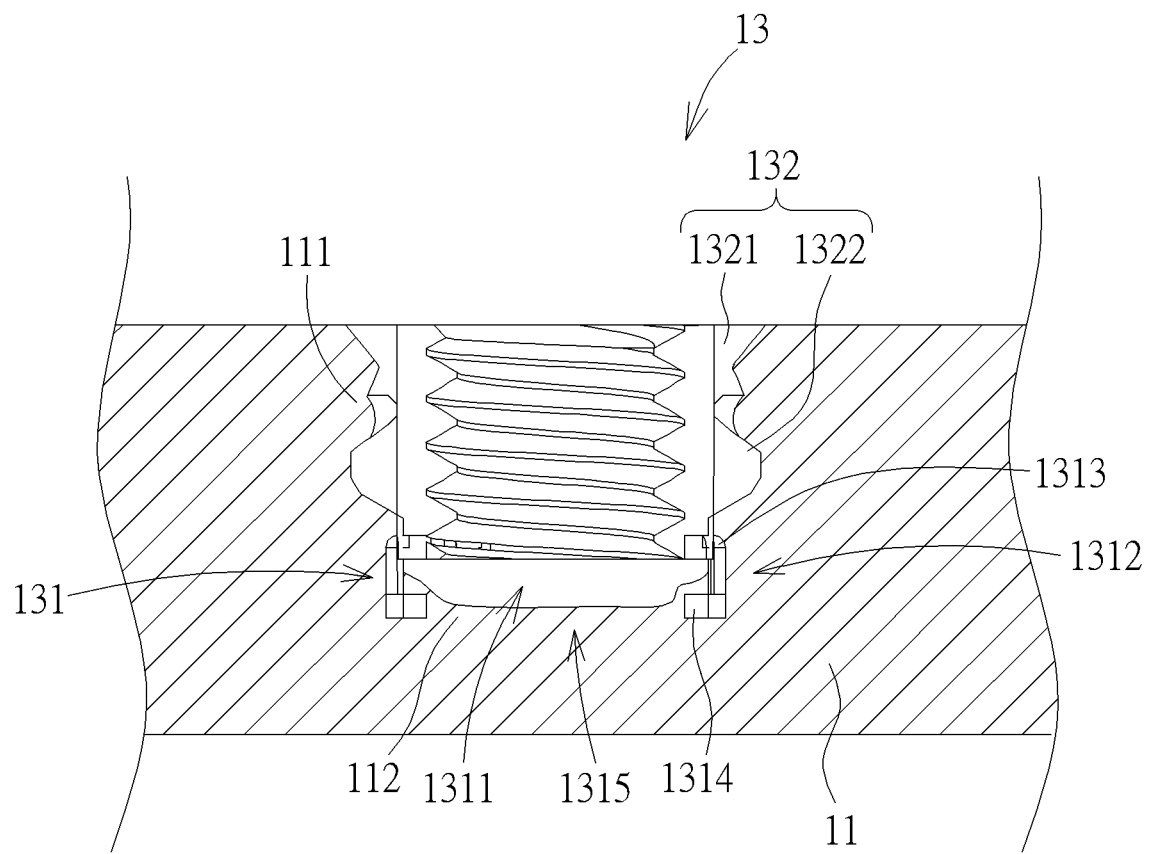
FIG. 7 is another diagram illustrating the locking structure is partially combined with the first assembling component according to the embodiment of the present disclosure.

It should be noticed that, as shown in FIG. 5, the recesses on the first thread portion 1321, the second thread portion 1322 and between the first thread portion 1321 and the second thread portion 1322 of the second combining portion 132, the chamber structure 1311 and the slot structures 1312, 1315 of the first combining portion 131 are completely filled with the first assembling component 11, which is an ideal combination state. However, in practical applications, the recesses on the first thread portion 1321, the second thread portion 1322 and between the first thread portion 1321 and the second thread portion 1322 of the second combining portion 132, the chamber structure 1311 and the slot structures 1312, 1315 of the first combining portion 131 may not be completely filled with the first assembling component 11. For example, please refer to FIG. 7. FIG. 7 is another diagram illustrating the locking structure 13 is partially combined with the first assembling component 11 according to the embodiment of the present disclosure. As shown in FIG. 7, the recesses on the first thread portion 1321, the second thread portion 1322 and between the first thread portion 1321 and the second thread portion 1322 of the second combining portion 132 is partially filled with the part 111 of the first assembling component 11. The chamber structure 1311 is partially filled with the another part 121 of the first assembling component 11, so that the another part 121 of the first assembling component 11 is partially combined with the inner sides and the outer sides of the side wall 1313 and the bottom wall 1314 of the first combining portion 131. Therefore, the combining surface area of the first assembling component 11 and the first combining portion 131 is increased. Understandably, the another part 121 of the melted first assembling component 11 can be partially combined with the inner side and outer side of the bottom wall 1314 or the side wall 1313 only to increase the combining surface area of the first assembling component 11 and the first combining portion 131 for enhancing the combining strength.

Furthermore, in this embodiment, the locking structure 13 can conform to a M3L3 nut. A volume of the melted workpiece generated by interference of the conventional M3L3 nut is about 2.05 mm$^2$. However, a combining volume of the workpiece combined with the conventional M3L3 nut is merely less than 1 mm$^2$. In the present disclosure, a combining volume of the first assembling component combined with the second combining portion 132 and the first combining component 131 of the locking structure 13 is more than 1.5 mm$^2$. In such a way, the locking structure 13 and the first assembling component 11 of the present disclosure have a better combining effect, which enhances a pulling resistant force of the locking structure 13. Therefore, as shown in FIG. 6, when the impact resistant assembling device 1, which is composed of the first assembling component 11 and the second assembling component 12 assembled with each other by the locking structure 13 and the locking component 14, receives an external force, the locking structure 13 cannot be pulled out of the first assembling component 11 easily. In other words, the first assembling component 11 and the second assembling component 12 do not depart from each other even if the impact resistant assembling device 1 falls down unintentionally. Therefore, the impact resistant assembling device 1 has an enhanced structural strength.

It should be noticed that the locking structure 13 of the present disclosure also can be combined with the first assembling component 11 by insert molding. In the aforementioned insert molding process, the locking structure 13 can be disposed inside a mold, which is not shown in figures. When the melted first assembling component 11 is injected into the mold, the recesses on the first thread portion 1321, the second thread portion 1322 and between the first thread portion 1321 and the second thread portion 1322 of the second combining portion 132 can be filled with the first assembling component 11, so that the first assembling component 11 is combined with the second combining portion 132. Furthermore, the chamber structure 1311 is also filled with the melted first assembling component 11 via the slot structures 1312 on the side wall 1313 and the slot structure 1315 on the bottom wall 1314, so that the first assembling component 11 is combined with the inner sides and the outer sides of the side wall 1313 and the bottom wall 1314 of the first combining portion 131 for enhancing the combining strength of the first assembling component 11 and the first combining portion 131.

Figure 8:
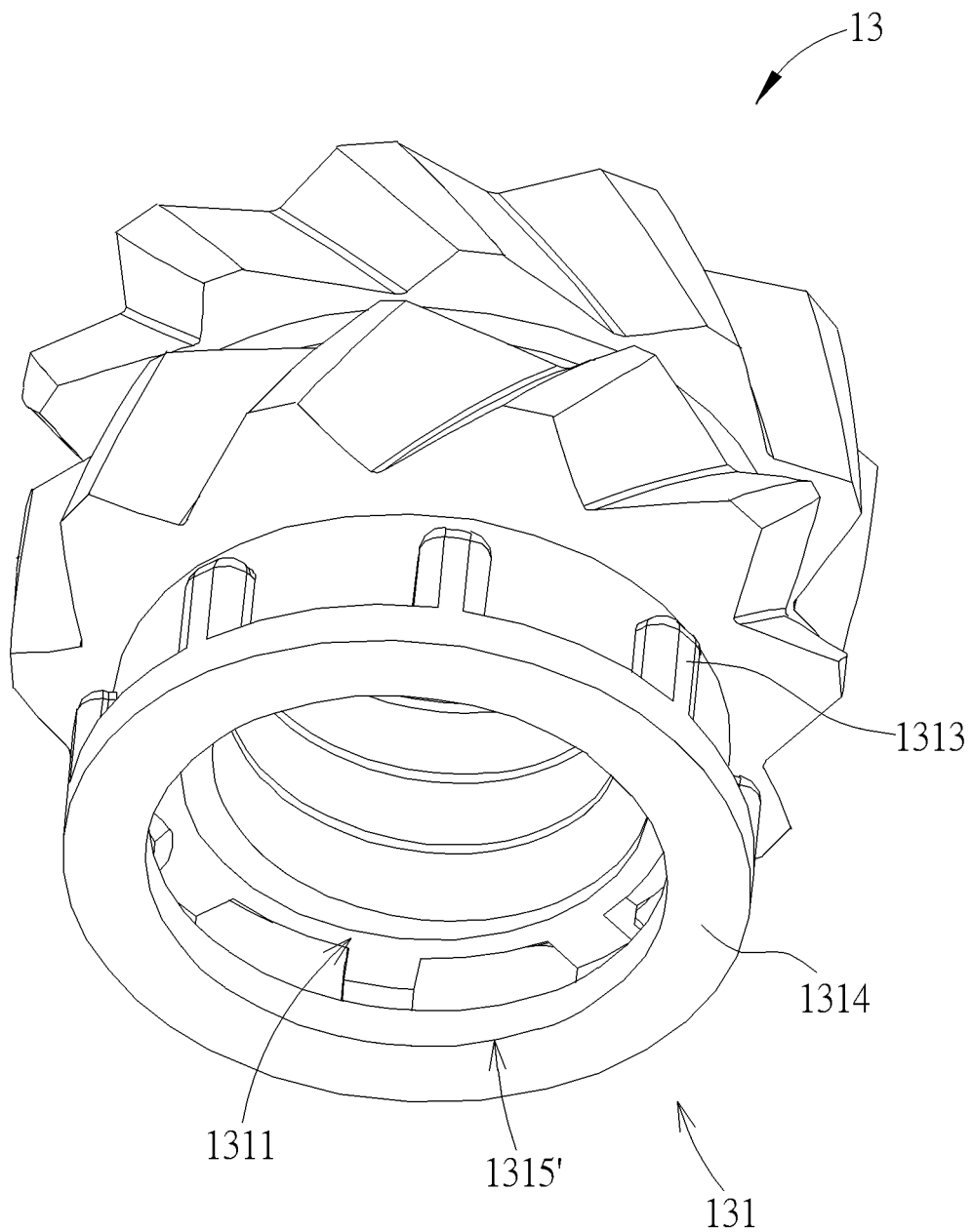
FIG. 8 to FIG. 11 are diagrams of the locking structure according to different embodiments of the present disclosure.
Figure 9:
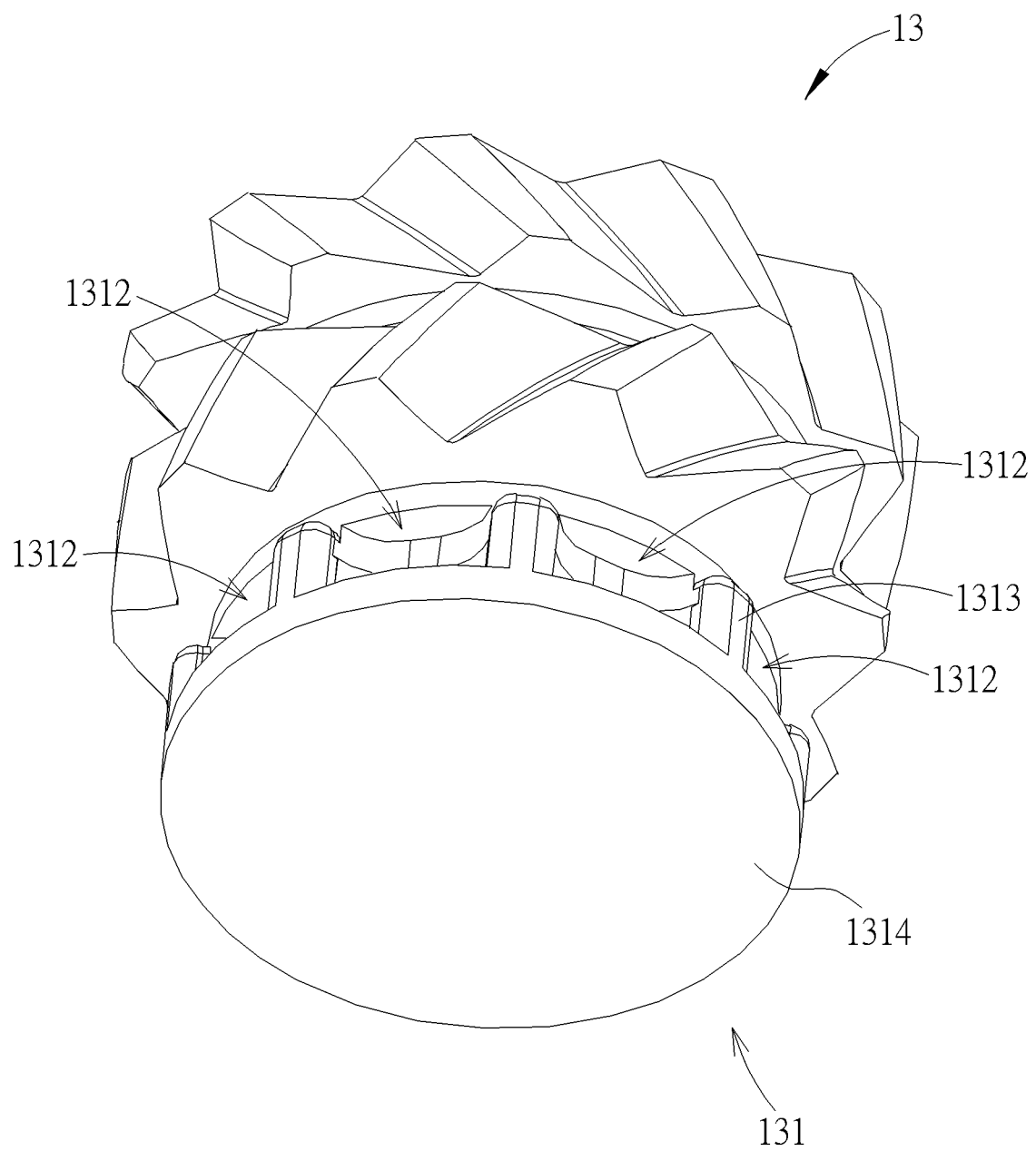
Figure 10:
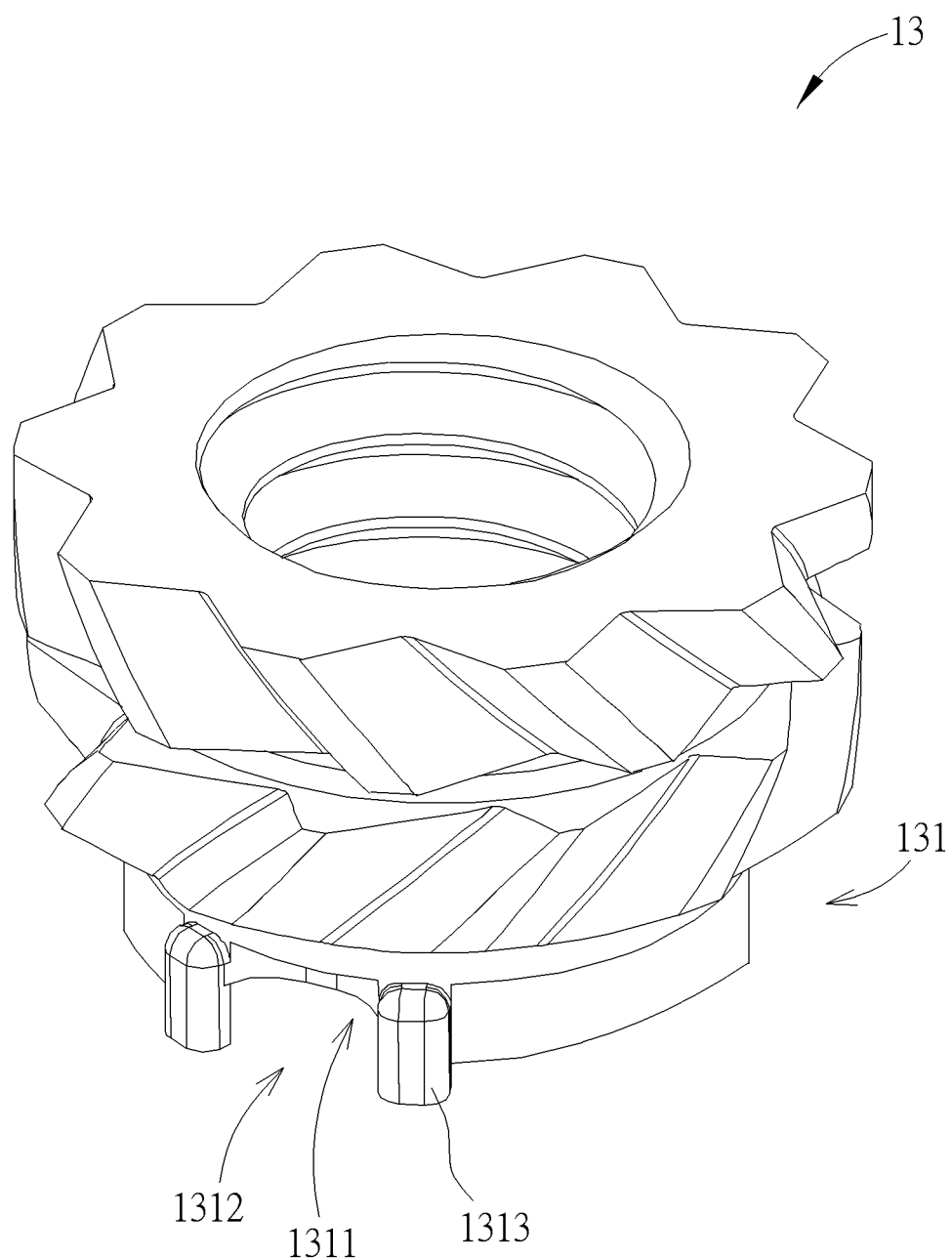
Figure 11:
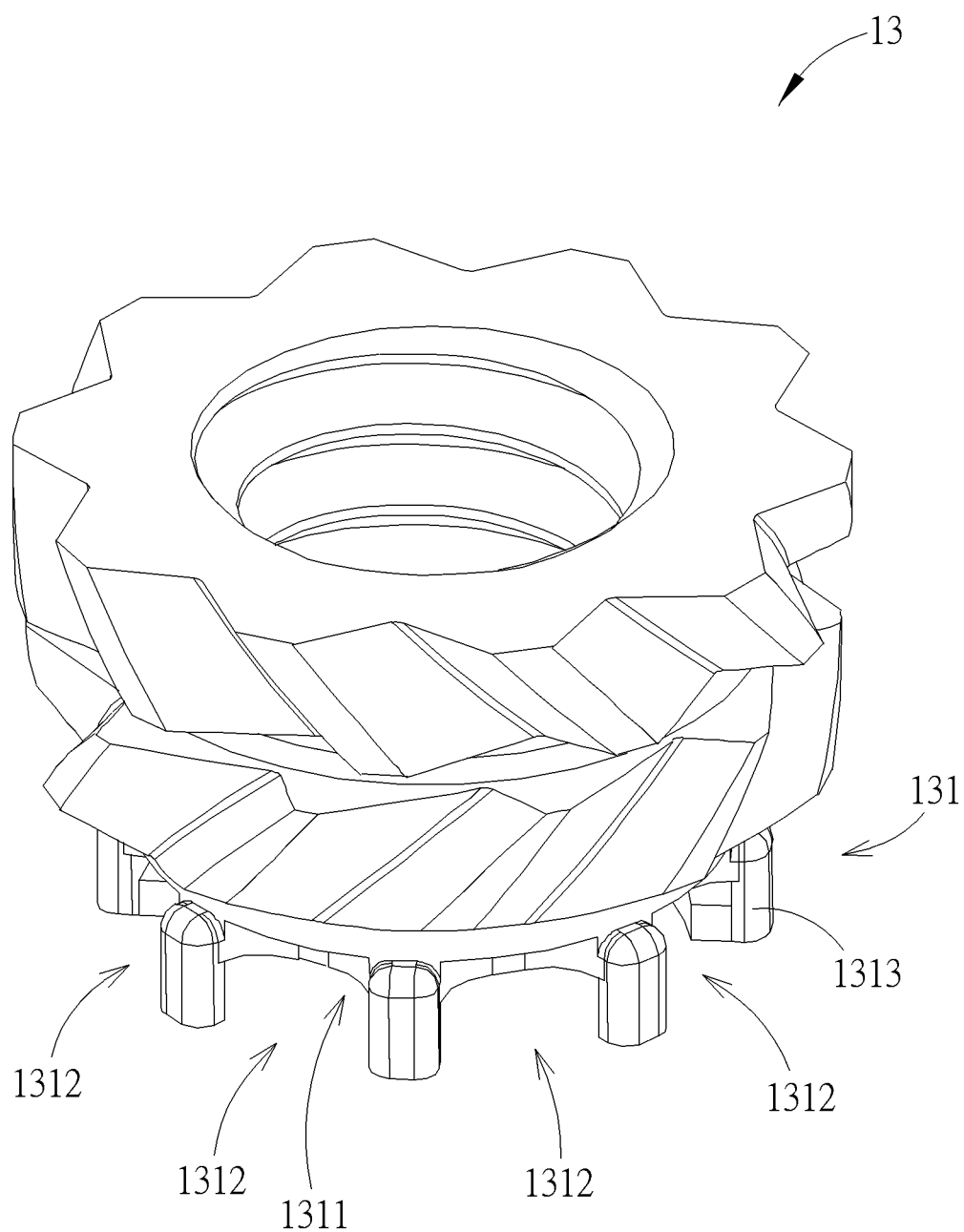

Furthermore, structure of the locking structure of the present disclosure is not limited to the aforementioned embodiment. For example, please refer to FIG. 8 to FIG. 11. FIG. 8 to FIG. 11 are diagrams of the locking structure 13 according to different embodiments of the present disclosure. As shown in FIG. 8, in this embodiment, the side wall 1313 of the first combining portion 131 can be a closed structure, that is there is no slot structure formed on the side wall 1313 of the first combining portion 131, and only one slot structure 1315' can be formed on the bottom wall 1314 of the first combining portion 131 for allowing the melted first assembling component 11 to flow into the chamber structure 1311 via the slot structure 1315' on the bottom wall 1314. Furthermore, a shape of the slot structure 1315' can be different from a shape of the slot structure 1315 of the first embodiment. As shown in FIG. 9, in this embodiment, the bottom wall 1314 of the first combining portion 131 can be a closed structure, that is there is no slot structure formed on the bottom wall 1314 of the first combining portion 131, and the eight slot structures 1312 can be formed on the side wall 1313 of the first combining portion 131 for allowing the melted first assembling component 11 to flow into the chamber structure 1311 via the slot structures 1312 on the side wall 1313. As shown in FIG. 10, in this embodiment, the first combining portion 131 even can include the side wall 1313 only, i.e., the bottom wall 1314 can be omitted. The slot structure 1312 is formed on the side wall 1313 for allowing the melted the first assembling component 11 to flow into the chamber structure 1311 via the slot structure 1312 on the side wall 1313 and/or the bottom of the chamber structure 1311. As shown in FIG. 11, in this embodiment, the first combining portion 131 also can include the side wall 1313 whereon the eight slot structures 1312 are formed for allowing the melted first assembling component 11 to flow into the chamber structure 1311 via the slot structures 1312 on the side wall 1313 and/or the bottom of the chamber structure 1311. In other words, any structure which allows the melted first assembling component to flow into the chamber structure to at least combine the first assembling component with the inner side and outer side of the first combining portion is included within the scope of the present disclosure.

In contrast to the prior art, the locking structure of the present disclosure not only utilizes the second combining portion for combining with the first assembling component, i.e., the workpiece, but also utilizes the slot structure and the chamber structure for allowing the melted first assembling component, i.e., the workpiece, to flow into the chamber structure via the slot structure to at least partially combine the first assembling component, i.e., the workpiece, with the inner side and the outer side of the first combining portion. Therefore, a combining surface area of the locking structure and the first assembling component, i.e., the workpiece, is enlarged, which achieves a better combining effect and increases tensile strength. In such a way, the first assembling component and the second assembling component which are assembled or combined with each other by the locking structure and the locking component can bear higher impact. Furthermore, the objective of increasing the tensile strength without extending a length of the locking structure, such as a nut, under a condition of a limited mechanical space can be achieved by the present disclosure, which cannot only save mechanical space but also facilitate lightweight design. Besides, the locking structure of the present disclosure can be combined with the first assembling component, i.e., the workpiece, by heating staking as well as the insert molding. Therefore, it can be widely used in different fields. Furthermore, as the locking structure is combined with the first assembling component by heat staking, it is not required to make a mold, which reduces manufacturing cost.

Those skilled in the art will readily observe that numerous modifications and alterations of the device and method may be made while retaining the teachings of the disclosure. Accordingly, the above disclosure should be construed as limited only by the metes and bounds of the appended claims.

What is claimed is:

1. A locking structure comprising:
    a main body; and
    a combining part comprising a first combining portion connected to a bottom portion of the main body, a communicating portion being formed on the first combining portion of the combining part, an inner side and an outer side of the first combining portion being communicated with each other by the communicating portion, the communicating portion comprising a chamber structure and at least one slot structure, the chamber structure being formed inside the first combining portion, the at least one slot structure being formed on a side wall or a bottom wall of the first combining portion, the at least one slot structure being communicated with the chamber structure, and when the workpiece and the first combining portion are combined with each other, the chamber structure being at least partially filled with the workpiece via the at least one slot structure, so that the workpiece is at least partially combined with the inner side of the first combining portion.

2. The locking structure of claim 1, wherein the combining part further comprises a second combining portion disposed on an outer periphery of the main body, and the second combining portion interferes with the workpiece to at least partially combine the workpiece with the inner side of the first combining portion via the communicating portion when the locking structure is embedded into the workpiece.

3. The locking structure of claim 2, wherein the second combining portion comprises a first thread portion and a second thread portion.

4. The locking structure of claim 3, wherein the first thread portion and the second thread portion are arranged oppositely and spaced from each other.

5. The locking structure of claim 1, wherein the side wall is connected to the bottom portion of the main body.

6. The locking structure of claim 5, wherein the chamber structure is enclosed and defined by the side wall of the first combining portion.

7. The locking structure of claim 6, wherein the at least one slot structure is formed on the side wall of the first combining portion.

8. The locking structure of claim 6, wherein the side wall is a ring-shaped structure.

9. The locking structure of claim 6, wherein the bottom wall is perpendicularly connected to the side wall, and the at least one slot structure is formed on the bottom wall of the first combining portion.

10. The locking structure of claim 1, wherein the side wall is connected to the bottom portion of the main body, the bottom wall is perpendicularly connected to the side wall, the chamber structure is enclosed and defined by the side wall and the bottom wall cooperatively, and the first combining portion comprises a plurality of slot structures communicated with the chamber structure and located on the side wall and the bottom wall of the first combining portion.

11. The locking structure of claim 1, wherein a through hole is formed inside the main body, and the chamber structure of the first combining portion is communicated with the through hole.

12. An impact resistant assembling device comprising:
   a first assembling component;
   a locking structure combined with the first assembling component, the locking structure comprising:
      a main body, a through hole being formed inside the main body; and
      a combining part comprises a first combining portion connected to a bottom portion of the main body, a communicating portion being formed on the first combining portion of the combining part, an inner side and an outer side of the first combining portion being communicated with each other by the communicating portion, the communicating portion comprising a chamber structure and at least one slot structure, the chamber structure being formed inside the first combining portion, the at least one slot structure being formed on a side wall or a bottom wall of the first combining portion, the at least one slot structure being communicated with the chamber structure, and when the first assembling component and the first combining portion are combined with each other, the chamber structure being at least partially filled with the first assembling component via the at least one slot structure, so that the first assembling component is at least partially combined with the inner side of the first combining portion;
   a second assembling component, an opening being formed on the second assembling component and located at a position corresponding to the locking structure; and
   a locking component passing through the opening and the through hole to engage with the main body sequentially, so as to combine the second assembling component with the first assembling component.

13. The impact resistant assembling device of claim 12, wherein the combining part further comprises a second combining portion disposed on an outer periphery of the main body, and the second combining portion interferes with the first assembling component to at least partially combine the first assembling component with the inner side of the first combining portion via the communicating portion when the locking structure is embedded into the first assembling component.

14. The impact resistant assembling device of claim 13, wherein the second combining portion comprises a first thread portion and a second thread portion.

15. The impact resistant assembling device of claim 14, wherein the first thread portion and the second thread portion are arranged oppositely and spaced from each other.

16. The impact resistant assembling device of claim 12, wherein the side wall is connected to the bottom portion of the main body.

17. The impact resistant assembling device of claim 16, wherein the chamber structure is enclosed and defined by the side wall of the first combining portion.

18. The impact resistant assembling device of claim 17, wherein the at least one slot structure is formed on the side wall of the first combining portion.

19. The impact resistant assembling device of claim 17, wherein the side wall is a ring-shaped structure.

20. The impact resistant assembling device of claim 17, wherein the bottom wall is perpendicularly connected to the side wall, and the at least one slot structure is formed on the bottom wall of the first combining portion.

21. The impact resistant assembling device of claim 12, wherein the side wall is connected to the bottom portion of the main body, the bottom wall is perpendicularly connected to the side wall, the chamber structure is enclosed and defined by the side wall and the bottom wall cooperatively, and the first combining portion comprises a plurality of slot structures communicated with the chamber structure and located on the side wall and the bottom wall of the first combining portion.

22. The impact resistant assembling device of claim 12, wherein the chamber structure of the first combining portion is communicated with the through hole.

23. A locking structure comprising:
   a combining part comprising a first combining portion and a second combining portion, a communicating portion being formed on the first combining portion of the combining part, an inner side and an outer side of the first combining portion being communicated with each other by the communicating portion, the communicating portion comprising a chamber structure and at least one slot structure, the chamber structure being formed inside the first combining portion, the at least one slot structure being formed on a side wall or a bottom wall of the first combining portion, the at least one slot structure being communicated with the chamber structure, and when the locking structure is embedded with a workpiece, the second combining portion interfering with the workpiece to at least partially fill the chamber structure with the workpiece via the at least one slot structure, so that the workpiece is at least partially combined with an inner side of the first combining portion.

* * * * *